(No Model.)
G. L. ROLLINS.
FEEDER FOR COTTON GINS.
No. 391,195. Patented Oct. 16, 1888.
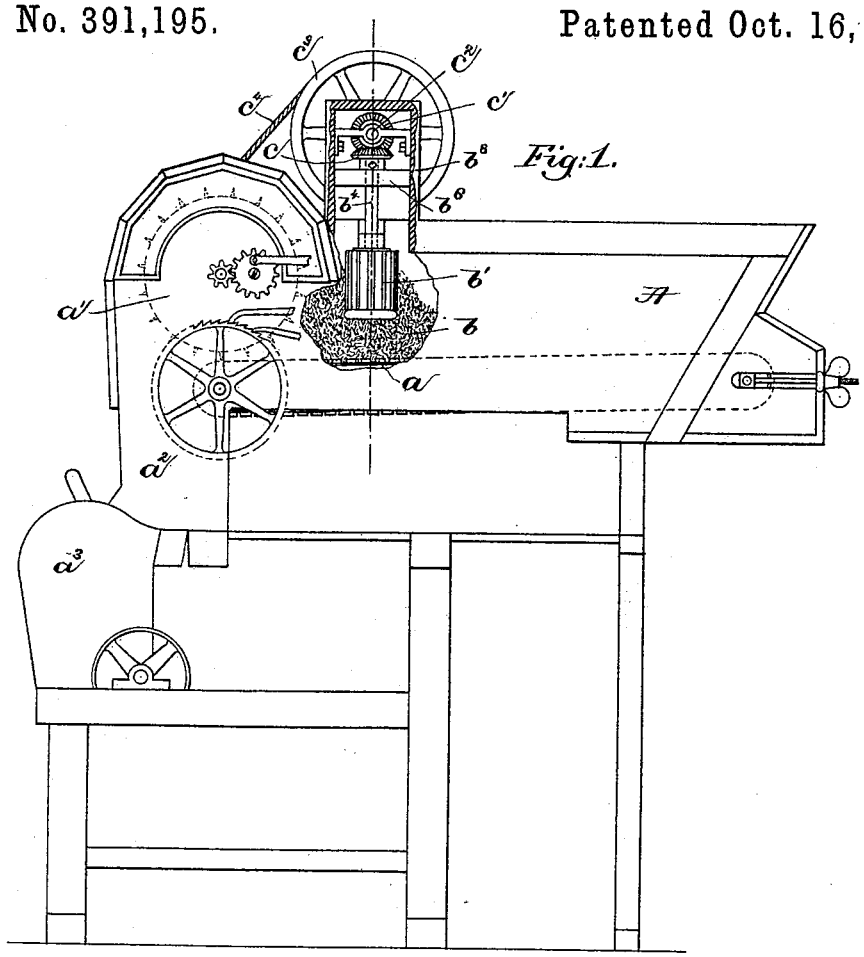
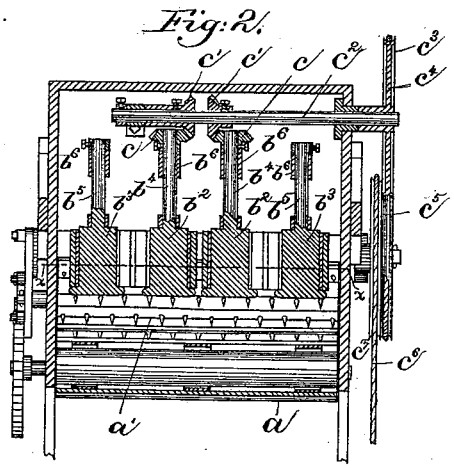
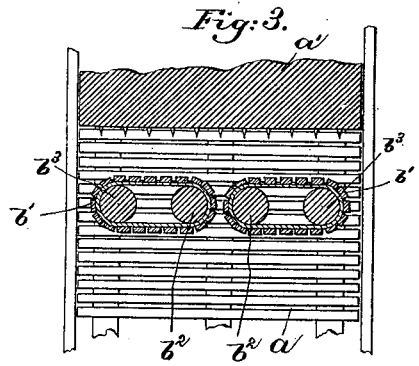
Witnesses.
Howard F. Eaton.
Frederick L. Emery.
Inventor:
George L. Rollins.
by Emery & Gregory.
Attys.

United States Patent Office.

GEORGE L. ROLLINS, OF BRIDGEWATER, MASSACHUSETTS, ASSIGNOR OF ONE-HALF TO THE EAGLE COTTON GIN COMPANY, OF SAME PLACE.

FEEDER FOR COTTON-GINS.

SPECIFICATION forming part of Letters Patent No. 391,195, dated October 16, 1888.

Application filed March 9, 1888. Serial No. 266,748. (No model.)

*To all whom it may concern:*

Be it known that I, GEORGE L. ROLLINS, of Bridgewater, in the county of Plymouth and State of Massachusetts, have invented an Improvement in Feeders for Cotton-Gins, of which the following description, in connection with the accompanying drawings, is a specification, like letters on the drawings representing like parts.

This invention relates to cotton-feeders employed with and forming part of a cotton-ginning apparatus, it having for its object to provide the feeder with means, as will be described, whereby the cotton may be more uniformly fed through the feeder to the ginning apparatus.

In cotton-gins as now constructed and known to me the cotton to be ginned is placed in a feeder having a traveling belt or apron, which latter feeds the cotton to the toothed feeding-surface called a "breaker," which may be of any usual construction.

With feeders of the class referred to the cotton tends to accumulate—that is, the thickness of the layer or mass of cotton is greater near the center of the breaker in the direction of its length, so that the cotton becomes clogged at the central part of the breaker, while at its ends there is an insufficient accumulation of cotton to keep the delivery or feed of cotton uniform. This inequality of feeding results in an inferior ginning of the cotton. It is the object of this invention to provide the feeder with a leveling apparatus, by which a uniformly thick layer of cotton is fed to the breaker.

By my improvement the cotton is prevented from piling up or accumulating in front of the center of the breaker, any extra thickness of cotton being carried from the center toward the sides of the feeder, so that as much cotton is acted upon by the teeth at the ends as at the center of the breaker, thus effecting a more uniform ginning of the cotton.

The particular features in which my invention consists will be pointed out in the claims at the end of this specification.

Figure 1 is a side elevation, partially broken out, of a ginning apparatus, having a feeder embodying my invention; Fig. 2, a transverse section through the feeder on line $x\ x$, Fig. 1; and Fig. 3, a horizontal sectional detail to be referred to.

The box A of the feeder contains an endless feeding belt or apron, $a$, which acts to feed the cotton placed thereon to the breaker or feeding-cylinder $a'$, the latter feeding the cotton through the chute $a^2$ into or to the gin $a^3$, which may be of any suitable or usual or known construction, such as now commonly used.

In accordance with my invention the box A is provided with two auxiliary belts or aprons, $b'$, they constituting the chief part of my improved apparatus, by which the cotton $b$ laid upon the belt or apron $a$ is leveled or spread out, so that substantially the same amount of cotton is acted upon by the breaker or feeding-cylinders $a'$ throughout its length. Each auxiliary belt or apron $b'$ is passed about and made to travel, as herein shown, by hubs $b^2\ b^3$, having shafts or spindles $b^4\ b^5$, supported in bearings $b^6$, herein shown as cross braces or bars of a frame, $b^8$, erected upon the box A. The shafts or spindles $b^4$ are provided, as shown, with bevel-gears $c$, in mesh with bevel-gears $c'$ on a shaft, $c^2$, herein shown as extended outside the box A, and provided with a pulley or sheave, $c^3$, rotated by a band, belt, or chain, $c^4$, passed about a sheave, $c^5$, on the shaft of the breaker or feeding-cylinder, the latter being rotated in usual or well-known manner by a band or chain, $c^6$, passed about a sheave, $c^7$, thereon.

In operation the cotton placed upon the belt or apron $a$ is carried thereby toward the breaker or feeding-cylinder $a'$. Without the auxiliary belts the cotton tends to pile up or accumulate in front of the breaker near its center owing to the greater amount of cotton which accumulates at the center line of the apron, and as a result thereof a large amount of cotton is fed to the center part of the gin, or the feeder clogs at the center of the breaker, while substantially little cotton is fed to the gin by the ends of the breaker.

By employing the auxiliary belts the cotton accumulating in front of the breaker or feeding-cylinder $a'$ is caught by the belts or aprons $b'$, which travel substantially at right angles to the belt or apron $a$, and carry the cotton toward the sides of the feeder, where it is fed forward to be acted upon by the ends of the breaker or feeding-cylinder $a'$.

By means of the belts or aprons $b'$ the surface of the cotton is leveled, so that the breaker or feeding-cylinder acts on substantially the same amount of cotton throughout its length—that is, substantially the same amount of cotton is fed to the gin by the ends as by the center of the feeding-cylinder.

I claim—

1. A breaker or feeding-cylinder and a belt or apron to feed the cotton to the said breaker or feeding-cylinder, combined with the movable belts forming part of a leveling apparatus to act on the cotton accumulated in front of the breaker and carry it toward the sides of the box of the feeder, and with means to actuate said movable belts, substantially as described.

2. A breaker or feeding-cylinder and a belt or apron to feed the cotton to the said breaker or feeding-cylinder, combined with a leveling apparatus consisting of belts or aprons $b'$, and with means to cause the said belts to travel substantially at right angles to the travel of the main feeding belt or apron, substantially as described.

In testimony whereof I have signed my name to this specification in the presence of two subscribing witnesses.

GEORGE L. ROLLINS.

Witnesses:
JAS. H. CHURCHILL,
B. DEWAR.